(12) United States Patent
Ioannou et al.

(10) Patent No.: US 10,169,363 B2
(45) Date of Patent: Jan. 1, 2019

(54) STORING DATA IN A DISTRIBUTED FILE SYSTEM

(71) Applicant: International Business Machines Corporation, Armonk, NY (US)

(72) Inventors: Nikolas Ioannou, Rueschlikon (CH); Ioannis Koltsidas, Rueschlikon (CH); Anil Kurmus, Rueschlikon (CH); Roman A. Pletka, Rueschlikon (CH); Alessandro Sorniotti, Rueschlikon (CH); Thomas D Weigold, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 14/790,351

(22) Filed: Jul. 2, 2015

(65) Prior Publication Data

US 2016/0070715 A1    Mar. 10, 2016

(30) Foreign Application Priority Data

Sep. 4, 2014    (GB) .................................... 1415664

(51) Int. Cl.
*G06F 17/30* (2006.01)
(52) U.S. Cl.
CPC .. *G06F 17/30156* (2013.01); *G06F 17/30109* (2013.01); *G06F 17/30194* (2013.01)
(58) Field of Classification Search
None
See application file for complete search history.

(56) References Cited

U.S. PATENT DOCUMENTS

| | | | |
|---|---|---|---|
| 7,747,584 B1 | 6/2010 | Jernigan, IV | |
| 8,200,923 B1 | 6/2012 | Healey et al. | |
| 9,613,064 B1* | 4/2017 | Chou | G06F 17/30289 |
| 2009/0319534 A1* | 12/2009 | Gokhale | G06F 17/30 |
| 2010/0161554 A1 | 6/2010 | Datuashvili et al. | |

(Continued)

FOREIGN PATENT DOCUMENTS

| | | |
|---|---|---|
| EP | 2256934 A1 | 1/2010 |
| WO | 2012173600 A1 | 12/2012 |

OTHER PUBLICATIONS

A.T. Clements, et al., "Decentralized Deduplication in San Cluster File Systems," Proceedings of the usenix annual technical conference, 2009, pp. 1-14.

(Continued)

*Primary Examiner* — Son T Hoang
(74) *Attorney, Agent, or Firm* — Cantor Colburn LLP

(57) ABSTRACT

A device for storing data in a distributed file system, the distributed file system including a plurality of deduplication storage devices, includes a determination unit configured to determine a characteristic of first data to be stored in the distributed file system; an identification unit configured to identify one of the deduplication storage devices of the distributed file system as deduplication storage device for the first data based on the characteristic of the first data; and a storing unit configured to store the first data in the identified deduplication storage device such that the first data and second data being redundant to the first data are deduplicatable within the identified deduplication storage device.

20 Claims, 4 Drawing Sheets

(56) References Cited

U.S. PATENT DOCUMENTS

| | | | |
|---|---|---|---|
| 2011/0087631 A1* | 4/2011 | Feldman | G06F 17/30067 |
| | | | 707/610 |
| 2013/0054540 A1 | 2/2013 | Factor et al. | |
| 2013/0238876 A1 | 9/2013 | Fiske et al. | |
| 2013/0246366 A1 | 9/2013 | Preslan et al. | |
| 2013/0318051 A1 | 11/2013 | Kumar et al. | |
| 2015/0269025 A1* | 9/2015 | Krishnamurthy | G06F 11/1092 |
| | | | 714/6.24 |

OTHER PUBLICATIONS

Anonymous, "Prior Identification of Potential Duplicate Pages for NFS Mounted File System Pages," IP.com Disclosure No. IPCOM000230915D, Sep. 18, 2013, pp. 1-14.

Davide Frey, et al., "Probabilistic Deduplication for Cluster-Based Storage Systems," AMC Proceedings of the third symposium on cloud SoCC, Oct. 14-17, 2012, pp. 1-19.

K. Kim, et al., "Content-Based Chunk Placement Scheme for Decentralized Depublication on Distributed File Systems," ICCSA Computational Science and Its Applications, Computer Science, vol. 7971, 2013, pp. 1-11.

UK IPO; Application No. GB1415664.0; Patent Act 1977: Search Report under Section 17(5); dated Mar. 12, 2015, pp. 1-5.

Zhe Sun et al., "A Novel Approach to Data Depulication Over the Engineering-Oriented Cloud Systems," Research online institutional repository for the University of Wollongong, 2013, pp. 1-14.

* cited by examiner

STORING DATA IN A DISTRIBUTED FILE SYSTEM

FOREIGN PRIORITY

This application claims priority to Great Britain Patent Application No. 1415664.0, filed Sep. 4, 2014, and all the benefits accruing therefrom under 35 U.S.C. § 119, the contents of which in its entirety are herein incorporated by reference.

BACKGROUND

The invention relates to a device and to a method for storing data in a distributed file system having a plurality of deduplication storage devices.

Data deduplication, i.e., the reduction and elimination of redundant data within a storage or memory device, is a data reduction technique already used in many contemporary enterprise storage stacks. For example, US 2010/0161554 A1, U.S. Pat. No. 7,747,584 B1 and EP 2256934 A1 disclose deduplication capable systems.

On one side, deduplication may lead to significant cost reductions directly resulting in a competitive advantage for customers as it enlarges the effective storage capacity, while on the other side its integration into flash-based storage provides manufacturers the possibility to reduce write amplification, thereby substantially extending flash endurance. The latter explains the recent growth in data deduplication-capable storage solutions being closely coupled with the recent growth of flash systems. While an I/O indirection property required by deduplication is a natural property of flash storage controllers, the drastically improved access times compared to traditional spinning disks may require fast index lookups for efficient inline deduplication.

Deduplication is typically performed at the file system level or block layer, but only the latter achieves high bandwidth when executed inline, i.e., within the storage devices. Also, network and clustered file systems (e.g., NFS, HDFS, Google FS, GPFS, etc.) are mostly agnostic to the underlying storage devices being deduplication-capable. In a likely near-future scenario, where most block devices participating in a network file system may offer data deduplication, their deduplication services could be underutilized because the same deduplicatable data might be spread over many deduplication-capable devices. Moreover, the perceived per-device capacity utilization at the file system-level might differ significantly from the actual one with possible implications in load balancing efforts.

Accordingly, it is an aspect of the present invention to improve the deduplication when storing data in storage devices which are deduplication-capable.

SUMMARY

In one aspect, a device for storing data in a distributed file system, the distributed file system including a plurality of deduplication storage devices. includes a determination unit configured to determine a characteristic of first data to be stored in the distributed file system; an identification unit configured to identify one of the deduplication storage devices of the distributed file system as deduplication storage device for the first data based on the characteristic of the first data; and a storing unit configured to store the first data in the identified deduplication storage device such that the first data and second data being redundant to the first data are deduplicatable within the identified deduplication storage device.

In another aspect, a method for storing data in a distributed file system, the distributed file system including a plurality of deduplication storage devices includes determining a characteristic of first data to be stored in the distributed file system; identifying one of the deduplication storage devices of the distributed file system as deduplication storage device for the first data based on the characteristic of the first data; and storing the first data in the identified deduplication storage device such that the first data and second data being redundant to the first data are deduplicatable.

In another embodiment, a nontransitory computer readable storage medium having computer readable instructions stored thereon that, when executed by a computer, implement a method for storing data in a distributed file system, the distributed file system including a plurality of deduplication storage devices, the method including determining a characteristic of first data to be stored in the distributed file system; identifying one of the deduplication storage devices of the distributed file system as deduplication storage device for the first data based on the characteristic of the first data; and storing the first data in the identified deduplication storage device such that the first data and second data being redundant to the first data are deduplicatable.

BRIEF DESCRIPTION OF THE DRAWINGS

Similar or functionally similar elements in the figures have been allocated the same reference signs if not otherwise indicated.

DETAILED DESCRIPTION

Figure 1:
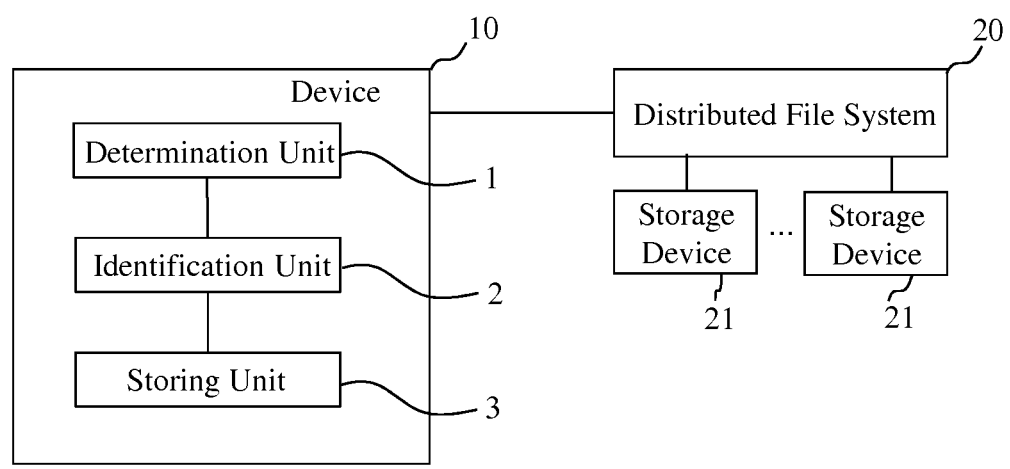
FIG. 1 shows an embodiment of a device for storing data in a distributed file system.

According to a first aspect, a device for storing data in a distributed file system is suggested. The distributed file system includes a plurality of deduplication storage devices. The device comprises a determination unit being configured to determine a characteristic of first data to be stored in the distributed file system, an identification unit being configured to identify one of the deduplication storage devices of the distributed file system as deduplication storage device for the first data based on the characteristic of the first data, and a storing unit being configured to store the first data in the identified deduplication storage device such that the first data and second data being redundant to the first data are deduplicatable within the identified deduplication storage device.

Deduplication in this context denotes the elimination or reduction of redundant data within a storage device. Thus, the required storage may be reduced. Deduplication storage devices in this context refer to storage or memory devices being capable of performing deduplication of redundant data. The deduplication storage devices may be called also storage devices throughout the application.

A distributed file system may include a plurality of storage devices. In a distributed or clustered file system, which is a computer network, information is stored on more than one node, often in a replicated fashion. Nodes in this context are different storage devices. These storage devices can be distributed within the network. The suggested device is based on the idea to provide a deduplication-aware device for storing or mapping data to be stored in a distributed file system. Before deciding in which storage device the data should be stored, the determination unit performs a determination of a characteristic of the first data, which is the data to be actually stored.

The identification unit may then identify or select an appropriate storage device for the first data based on the characteristic. Thus, when storing new data, or data files, the identification unit performs a mapping of the new data, i.e., the first data, to the storage devices, or more precisely to the already stored data. Thus, the first data and the second data, or other redundant data within the same storage device, can be deduplicated.

Based on the suggested device, a mapping layer is provided that enhances a clustered file system into being deduplication-aware through content based data mapping. Through content based mapping, the device, and thus the distributed file system, is able to fully utilize the deduplication potential of the underlying storage devices.

According to an embodiment, the determination unit is configured to compare metadata of the first data and the second data. The metadata may be a characteristic of the first data and may be any kind of information being part of the first data and/or the second data, or any other data within the storage devices. The metadata may be information being already part of the data of clustering file systems.

According to a further embodiment, the metadata includes a digest and/or a fingerprint of the first data. The metadata may be in the form of digest or fingerprint being added to the data, for example as additional header information.

According to a further embodiment, when the result of the comparison is negative, the identification unit is configured to identify any deduplication storage device of the plurality of deduplication storage devices as the deduplication storage device of the first data. When the result of the comparison is negative, there exists no data being identical to the first data. Thus, any of the storage devices may be used. As there is no redundant, i.e., identical, data already stored in the plurality of storage devices, deduplication cannot be performed.

According to a further embodiment, when the result of the comparison is positive, the identification unit is configured to identify the deduplication storage device storing the second data. When the result is positive, i.e., when there is second data being identical to the first data already stored in one of the storage devices, the first data will be stored in the same storage device as the second data. Thus, deduplication can be performed within this storage device for the first data and the second data. However, also if the comparison result is erroneously positive, this does not have any impact on the storage procedure.

According to a further embodiment, the determination unit is configured to compute a hash of a content of the first data using a hash function. According to this embodiment, the characteristic of the first data is a hash value. Based on this hash value, the identification unit can decide which storage device already comprises second data being identical to the first data. In this case, the content of the data is directly compared.

According to a further embodiment, the hash function is a generic non-cryptographic hash function. Such non-cryptographic hash functions may be for example CityHash or MurmurHash. These hash functions are used not for cryptographic purposes but for allowing a mapping of the first data to the second data using a hash value. The hash functions should be fast to be computed.

According to a further embodiment, the identification unit is configured to identify a deduplication storage device based on load balancing. According to this embodiment, the identification unit may not only identify a storage device based on the comparison result but in addition on load balancing considerations. Thus, the data to be stored may be in addition distributed over the plurality of storage devices in order to distribute workloads across the storage devices. This may be in particular the case when there is no data being redundant to the first data.

According to a further embodiment, the storing unit is configured to perform a write request to the identified deduplication storage device. When the identification unit has identified a storage device for the first data, the storing unit may send a write request to the identified storage device. The identified storage device may then process the write request and store, i.e., write, the data to memory cells of the identified storage device.

According to a further embodiment, when the write request fails, the storing unit is configured to perform a write request to a random deduplication storage device. If there is not enough memory space or also due to any other cause, the write request may fail. In such a case, the storing unit may perform a write request to any other storage device. In this case, the storing unit may take into account load balancing.

According to a second aspect, a computerized system is suggested. The computerized system comprises a distributed file system including a plurality of deduplication storage devices, and a device for storing data in the distributed file system as described above.

The fact that the distributed file system includes a plurality of deduplication storage devices does not necessarily mean that the distributed file system physically includes the storage devices but the distributed file system logically includes the storage devices. This can also be denoted as the distributed file system being mounted on the plurality of storage devices.

According to an embodiment, each of the plurality of deduplication storage devices is configured to carry out a storage-internal deduplication. The deduplication is not performed at the layer of the device for storing data or at the layer of the distributed file system, but at the layer of the storage devices. Thus, each storage device performs a deduplication if necessary.

According to a further embodiment, the device for storing data in the distributed file system is arranged at the layer of the distributed file system. Thus, the device is arranged above the storage devices and is deduplication-aware but does not perform a deduplication itself.

According to a third aspect, a method for storing data in a distributed file system is suggested. The method comprises the following operations: determining a characteristic of first data to be stored in the distributed file system, identifying one of the deduplication storage devices of the distributed file system as deduplication storage device for the first data based on the characteristic of the first data, and storing the first data in the identified deduplication storage device such that the first data and second data being redundant to the first data are deduplicatable.

According to a fourth aspect, the invention relates to a computer program comprising a program code for executing at least one operation of the method of the third aspect for storing data in a distributed file system when run on at least one computer.

In the following, exemplary embodiments of the present invention are described with reference to the enclosed figures.

FIG. 1 shows a device 10 for storing data in a distributed file system 20. Although the device 10 and the file system 20 are shown as separate units, the device 10 may be part of the file system 20 or may be arranged as a mapping layer at the layer of the distributed file system 20. This is also shown in FIG. 2.

The device 10 comprises a determination unit 1, an identification unit 2, and a storing unit 30. When data should be stored in the distributed file system 20, or more precisely in one of the deduplication storage devices 21 of the distributed file system 20, the determination unit 1 first determines a characteristic of the data to be stored, in the following also called first data. The characteristic may be a hash value as described in the following. Based on the characteristic, the identification unit 2 can identify a storage device 21 in which data is already stored being identical to the first data. This data is in the following also called second data.

The determination unit 1 can perform a content-based comparison, for example using a hash function, of the first data and the second data. When there is second data being identical to the first data, the comparison result of the determination unit 1 is positive. The identification unit 2 can then identify one of the storage devices 21 as the storage device 21 for the first data based on this result. The idea is to store identical or redundant data within the same storage device 21 to improve deduplication of redundant data. The storing unit 3 then performs storing of the first data in the identified storage device 21. Each of the storage devices 21 is configured to carry out a deduplication in order to eliminate or reduce redundant data. This is done at the layer of the storage devices 21.

Figure 2:
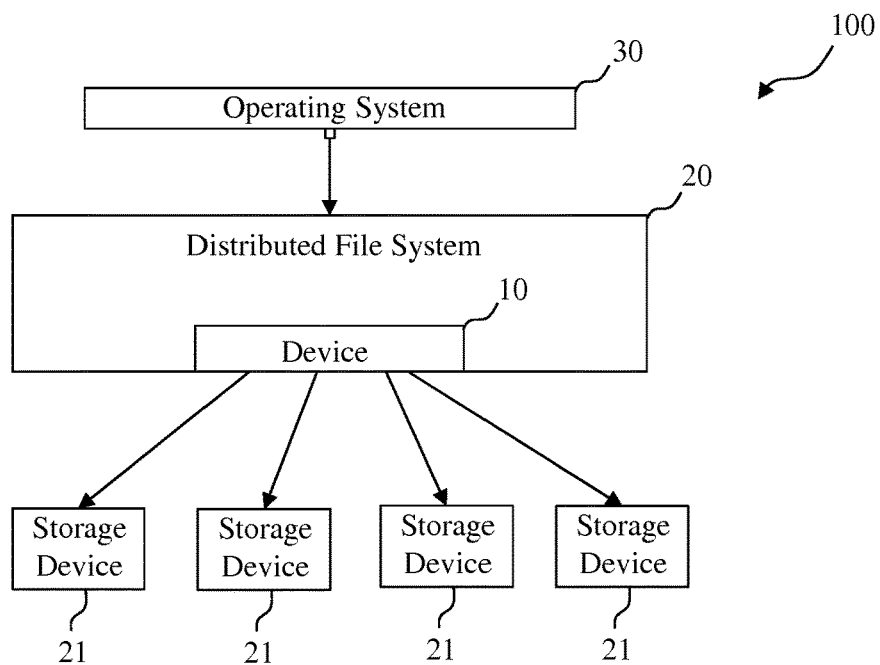
FIG. 2 shows an embodiment of a computerized system comprising a device for storing data in a distributed file system.

As can be seen in FIG. 2, the device 10 for storing data is arranged at the layer of the distributed file system 20. The distributed file system 20 can be accessed by an operating system 30 of the computerized system 100. The device 10 for storing data can also be called mapping layer as it maps the first data to redundant second data.

Figure 3:
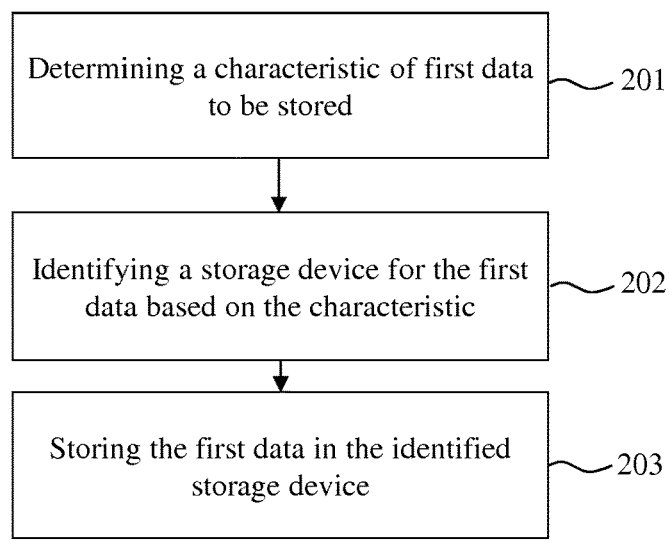
FIG. 3 shows an embodiment of a sequence of method operations for storing data in a distributed file system.

FIG. 3 shows an embodiment of a sequence of method operations for storing data in a distributed file system. The method of FIG. 3 has the following operations 201-203. In a first operation 201, a characteristic of first data to be stored in the distributed file system 20 is determined. In a second operation 202, one of the deduplication storage devices 21 of the distributed file system 20 is identified as deduplication storage device 21 for the first data based on the characteristic. In a third operation 203, the first data is stored in the identified deduplication storage device 21 such that the first data and second data being redundant to the first data are deduplicatable.

Figure 4:
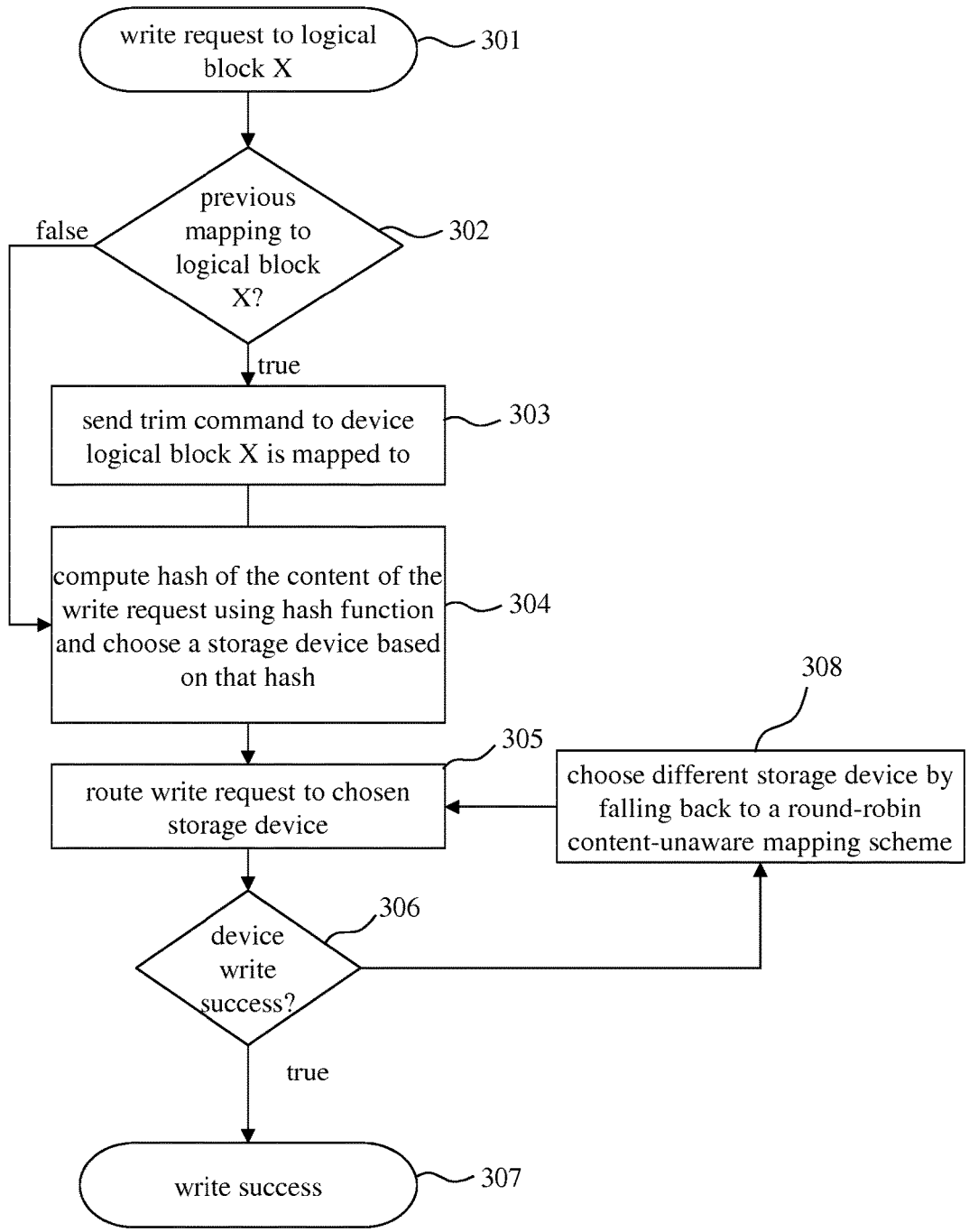
FIG. 4 shows another embodiment of a sequence of method operations for storing data in a distributed file system.
Figure 5:
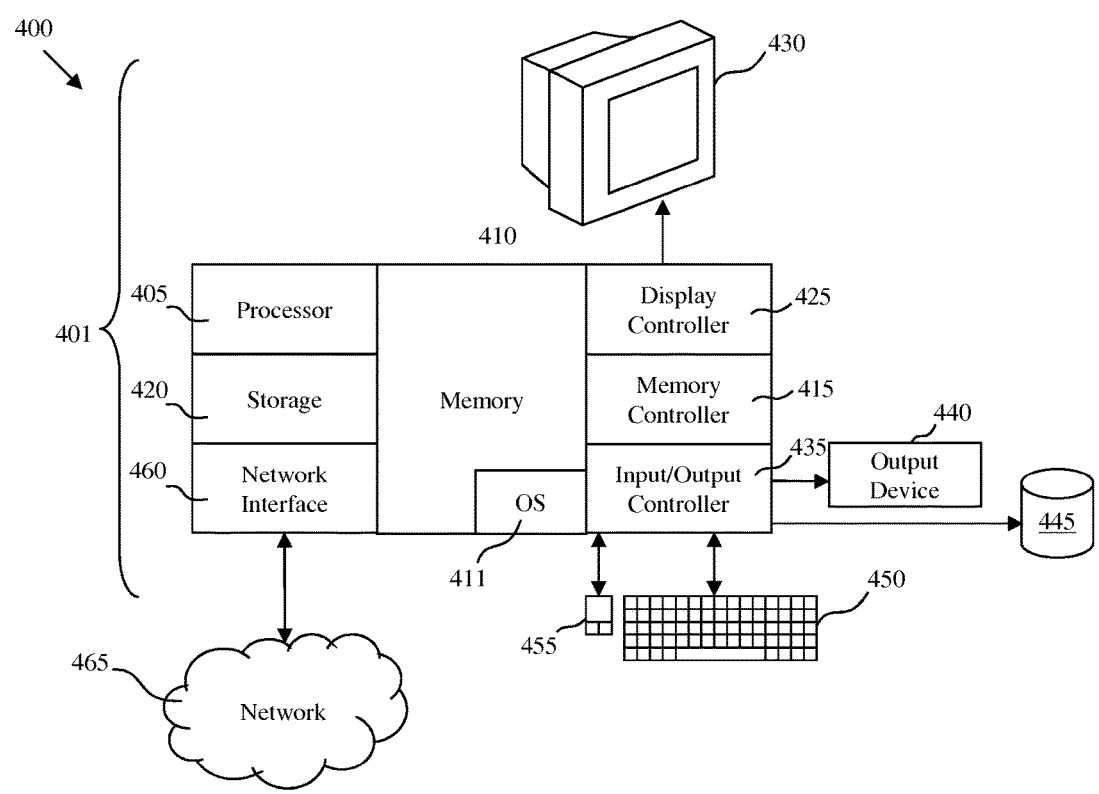
FIG. 5 shows a schematic block diagram of an embodiment of a system configured for performing the method for determining an actual level of a resistive memory cell.

FIG. 4 shows another embodiment of a sequence of method operations for storing data in a distributed file system. In a first operation 301, a write request to a logical block X is generated. The distributed file system 20 comprises a plurality of logical blocks which are mapped to the physical storage devices 21. In a second operation 302, it is determined whether there exists a previous mapping to the logical block X. If not, the hash of the content of the write request, i.e., of the first data, is computed and a storage device 21 is chosen based on that hash in operation 304. Operation 304 corresponds to operations 201 and 202 of FIG. 3. If yes, a trim command is send to the storage device 21 the logical block X is mapped to in operation 303. Then, operation 304 is carried out. Trim command in this context is a command to inform a storage device 21 which blocks of data are no longer considered in use and can be wiped internally.

Subsequently, in operation 305, the write request is routed to the chosen or identified storage device 21. This corresponds to operation 203 of FIG. 3. If the write operation was successful (determined in operation 306), a write success signal can be output, operation 307. If the write operation was unsuccessful, a different storage device 21 can be chosen in operation 308 by falling back to a round-robin content-unaware mapping scheme. Such a scheme may be based on load balancing. Then, the method returns to operation 305.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one operation or all operations of above methods of FIGS. 3 and 4 may be implemented in software, as an executable program, the latter executed by suitable digital processing devices. More generally, embodiments of the present invention may be implemented wherein general-purpose digital computers, such as personal computers, workstations, etc., are used.

For instance, the system 400 depicted in FIG. 4 schematically represents a computerized unit 401, e.g., a general-purpose computer. In exemplary embodiments, in terms of hardware architecture, as shown in FIG. 4, the unit 401 includes a processor 405, memory 410 coupled to a memory controller 415, and one or more input and/or output (I/O) devices 440, 445, 450, 455 (or peripherals) that are communicatively coupled via a local input/output controller 435. Further, the input/output controller 435 may be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 is a hardware device for executing software, particularly that stored in memory 410. The processor 405 may be any custom made or commercially available processor, a central processing unit (CPU), an auxiliary processor among several processors associated with the computer 401, a semiconductor based microprocessor (in the form of a microchip or chip set), or generally any device for executing software instructions.

The memory 410 may include any one or combination of volatile memory elements (e.g., random access memory) and nonvolatile memory elements. Moreover, the memory 410 may incorporate electronic, magnetic, optical, and/or other types of storage media. Note that the memory 410 may have a distributed architecture, where various components are situated remote from one another, but may be accessed by the processor 405. The memory 410 may correspond to the distributed file system 20 of FIGS. 1 and 2.

The software in memory 410 may include one or more separate programs, each of which comprises an ordered listing of executable instructions for implementing logical functions. In the example of FIG. 4, the software in the memory 410 includes a method described herein in accordance with exemplary embodiments and a suitable operating system (OS) 411, which may correspond to the operating system 30 of FIG. 2. The OS 411 essentially controls the execution of other computer programs, such as the method as described herein (e.g., FIG. 3), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 410, so as to operate properly in connection with the OS 411. Furthermore, the methods may be written as an object oriented programming language, which has classes of data and methods, or a procedure programming language, which has routines, subroutines, and/or functions.

Possibly, a conventional keyboard 450 and mouse 455 may be coupled to the input/output controller 435. Other I/O devices 440-455 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 435 for further processing. Sensor nodes are ideally small, consume low energy, are autonomous and operate unattended.

In addition, the I/O devices 440-455 may further include devices that communicate both inputs and outputs. The system 400 may further include a display controller 425 coupled to a display 430. In exemplary embodiments, the system 400 may further include a network interface or transceiver 460 for coupling to a network 465.

The network 465 transmits and receives data between the unit 401 and external systems. The network 465 is possibly implemented in a wireless fashion, e.g., using wireless protocols and technologies, such as WiFi, WiMax, etc. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 465 may also be an IP-based network for communication between the unit 401 and any external server, client and the like via a broadband connection. In exemplary embodiments, network 465 may be a managed IP network administered by a service provider. Besides, the network 465 may be a packet-switched network such as a LAN, WAN, Internet network, etc.

If the unit 401 is a PC, workstation, intelligent device or the like, the software in the memory 410 may further include a basic input output system (BIOS). The BIOS is stored in ROM so that the BIOS may be executed when the computer 401 is activated.

When the unit 401 is in operation, the processor 405 is configured to execute software stored within the memory 410, to communicate data to and from the memory 410, and to generally control operations of the computer 401 pursuant to the software. The method described herein and the OS 411, in whole or in part are read by the processor 405, typically buffered within the processor 405, and then executed. When the method described herein (e.g., with reference to FIG. 3) is implemented in software, the method may be stored on any computer readable medium, such as storage 420, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 401, partly thereon, partly on a unit 401 and another unit 401, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE SIGNS 1 determination unit
2 identification unit
3 storing unit
10 device
20 distributed file system
21 deduplication storage devices
30 operating system
100 computerized system
201-203 method operations
301-308 method operations
400 system
401 computerized unit
405 processor
410 memory
411 operating system (OS)
415 memory controller
420 storage
425 display controller
440 display
445, 450, 455 input and/or output (I/O) devices
435 local input/output controller
450 keyboard
455 mouse
460 network interface or transceiver
465 network

The invention claimed is:

1. A hardware device for storing data in a distributed file system, the distributed file system including a plurality of nonvolatile deduplication storage devices, the device comprising:
   at least one memory storing computer-executable instructions; and
   at least one processor configured to access the at least one memory and execute the computer-executable instructions to:
   receive a request to store first data in the distributed file system;
   determine a characteristic of the first data;
   identify one of the plurality of nonvolatile deduplication storage devices of the distributed file system as a deduplication storage device for the first data based on the determined characteristic of the first data matching a characteristic of second data stored in the identified deduplication device;
   determine that the first data is redundant to the second data based on the determined characteristic of the first data matching the characteristic of the second data; and
   in response at least in part to determining that the first data is redundant to the second data, store the first data in the identified deduplication storage device such that the first data and the second data are redundantly stored in the identified deduplication storage device and are deduplicatable within the identified deduplication storage device after the first data is redundantly stored.

2. The device of claim 1, wherein the at least one processor is further configured to execute the computer-executable instructions to compare metadata of the first data and metadata of the second data.

3. The device of claim 2, wherein each of the metadata includes one or more of a digest and a fingerprint of one or more of the first data and the second data.

4. The device of claim 2, wherein, when a result of the comparison is negative, the at least one processor is configured to execute the computer-executable instructions to identify any deduplication storage device of the plurality of nonvolatile deduplication storage devices as the deduplication storage device for the first data.

5. The device of claim 2, wherein, when a result of the comparison is positive, the at least one processor is configured to execute the computer-executable instructions to identify the deduplication storage device storing the second data.

6. The device of claim 1, wherein the at least one processor is configured to determine the characteristic of the first data by executing the computer-executable instructions to compute a hash of content of the first data using a hash function, wherein the hash is the characteristic of the first data.

7. The device of claim 6, wherein the hash function is a generic non-cryptographic hash function.

8. The device of claim 1, wherein the at least one processor is configured to identify the deduplication storage device based on load balancing.

9. The device of claim 1, wherein the at least one processor is configured to store the first data in the identified deduplication storage device by executing the computer-executable instructions to perform a write request to the identified deduplication storage device.

10. The device of claim 9, wherein, when the write request fails, the at least one processor is configured to execute the computer-executable instructions to perform a write request to a random deduplication storage device.

11. A computerized system, comprising:
a distributed file system including a plurality of deduplication storage devices; and
the hardware device configured to store data in the distributed file system as claimed in claim 1.

12. The computerized system of claim 11, wherein each of the plurality of deduplication storage devices is configured to carry out a storage-internal deduplication.

13. The computerized system of claim 11, wherein the device for storing data in the distributed file system is arranged at the layer of the distributed file system.

14. A method, implemented by one or more computing systems, for storing data in a distributed file system, the distributed file system including a plurality of nonvolatile deduplication storage devices, the method comprising:
receiving a request to store first data in the distributed file system;
determining a characteristic of the first data;
identifying one of the plurality of nonvolatile deduplication storage devices of the distributed file system as a deduplication storage device for the first data based on the determined characteristic of the first data matching a characteristic of second data stored in the identified deduplication device;
determining that the first data is redundant to the second data based on the determined characteristic of the first data matching the characteristic of the second data; and
in response at least in part to determining that the first data is redundant to the second data, storing the first data in the identified deduplication storage device such that the first data and the second data are redundantly stored in the identified deduplication storage device and are deduplicatable within the identified deduplication storage device after the first data is stored.

15. The method of claim 14, further comprising comparing metadata of the first data and metadata of the second data.

16. The method of claim 15, wherein each of the metadata includes one or more of a digest and a fingerprint of one or more of the first data and the second data.

17. The method of claim 15, wherein, when a result of the comparison is negative, identifying one of the plurality of nonvolatile deduplication storage devices of the distributed file system as the deduplication storage device for the first data comprises identifying any deduplication storage device of the plurality of deduplication storage devices as the deduplication storage device for the first data.

18. The method of claim 15, wherein, when a result of the comparison is positive, identifying one of the plurality of nonvolatile deduplication storage devices of the distributed file system as the deduplication storage device for the first data comprises identifying the deduplication storage device storing the second data.

19. The method of claim 14, wherein determining the characteristic of the first data comprises computing a hash of content of the first data using a generic non-cryptographic hash function, wherein the hash is the characteristic of the first data.

20. A nontransitory computer readable storage medium having computer readable instructions stored thereon that, when executed by a computer, implement a method for storing data in a distributed file system, the distributed file system including a plurality of nonvolatile deduplication storage devices, the method comprising:
receiving a request to store first data in the distributed file system;
determining a characteristic of the first data;
identifying one of the plurality of nonvolatile deduplication storage devices of the distributed file system as deduplication storage device for the first data based on the determined characteristic of the first data matching a characteristic of second data stored in the identified deduplication device;
determining that the first data is redundant to the second data based on the determined characteristic of the first data matching the characteristic of the second data; and
in response at least in part to determining that the first data is redundant to the second data, storing the first data in the identified deduplication storage device such that the first data and the second data are redundantly stored in the identified deduplication storage device and are deduplicatable within the identified deduplication storage device after the first data is stored.

* * * * *